United States Patent
Zhang et al.

(10) Patent No.: US 12,279,719 B2
(45) Date of Patent: Apr. 22, 2025

(54) FOOD GRINDER

(71) Applicant: Tsann Kuen (Zhangzhou) Enterprise Co., Ltd., Fujian (CN)

(72) Inventors: Wenxia Zhang, Fujian (CN); Mingli Chen, Fujian (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 375 days.

(21) Appl. No.: 18/081,908

(22) Filed: Dec. 15, 2022

(65) Prior Publication Data

US 2023/0225564 A1 Jul. 20, 2023

(30) Foreign Application Priority Data

Jan. 18, 2022 (CN) .......................... 202210054112.X

(51) Int. Cl.
| | |
|---|---|
| A47J 43/08 | (2006.01) |
| A47J 42/46 | (2006.01) |
| A47J 43/07 | (2006.01) |
| A47J 43/25 | (2006.01) |

(52) U.S. Cl.
CPC ............. *A47J 43/08* (2013.01); *A47J 43/255* (2013.01)

(58) Field of Classification Search
CPC .......... A47J 43/255; A47J 43/08; A47J 43/46; A47J 43/07
See application file for complete search history.

(56) References Cited

U.S. PATENT DOCUMENTS 5,364,037 A * 11/1994 Bigelow ............... A47J 43/255
241/273.3
2004/0079820 A1* 4/2004 So ......................... A47J 43/255
241/93

FOREIGN PATENT DOCUMENTS

EP 1584275 A2 * 10/2005 ............ A47J 43/255

OTHER PUBLICATIONS

English translate (EP1584275A2), retrieved date Feb. 6, 2025.*

* cited by examiner

Primary Examiner — Mohammed S. Alawadi
(74) Attorney, Agent, or Firm — Burris Law, PLLC

(57) ABSTRACT

A food grinder includes a grip mechanism having a flip cover body pivotally connected to a handle body, a cylindrical cutter set detachably mounted in the handle body, and a driving mechanism mounted in the grip mechanism. The grip mechanism includes first and second switch units electrically connected in series between a driving unit and a power supply unit. When the first switch unit is manually actuated to turn on while the second switch unit is actuated to turn on by the flip cover body as the flip cover body pivots toward a closing position, the driving unit operates with electric power supplied from the power supply unit to drive rotation of a cylindrical cutter of the cylindrical cutter set disposed in the handle body, such that a food ingredient in an inlet in the handle body is cut and grinded by the rotating cylindrical cutter.

11 Claims, 8 Drawing Sheets

FOOD GRINDER

CROSS-REFERENCE TO RELATED APPLICATION

This application claims priority to Chinese Patent Application No. 202210054112. X, filed on Jan. 18, 2022.

FIELD

The disclosure relates to a food processing apparatus, more particularly to a food grinder capable of grinding and cutting food ingredients.

BACKGROUND

In order to produce cheese shreds from a block of cheese for convenience of use, an electric cheese grinder (or grater) has been developed, and generally includes a handle, a pressing plate pivoted to the handle, and a cylindrical cutter set disposed in the handle. After the block of cheese to be cut is placed into an inlet of the handle, the pressing plate is pivoted to move toward the handle, so that the block of cheese in the inlet is pressed against the cylindrical cutter set. When the electric cheese grinder is activated, the cylindrical cutter set is driven to rotate to cut and grind the block of cheese.

Although the electric cheese grinder is quite convenient to use, there are safety concerns with such electric cheese grinder. Since the cylindrical cutter set is driven to rotate after the power switch is turned on, if the pressing plate is pivoted to move away from the inlet, the block of cheese remaining in the inlet will be thrown out of the cylindrical cutter set and stain the surrounding environment or hurt someone, and the rotating cylindrical cutter set exposed through the inlet will also easily injure the user when the user accidentally touches it.

SUMMARY

Therefore, an object of the disclosure is to provide a food grinder that can alleviate at least one of the drawbacks of the prior art.

According to the disclosure, a food grinder is adapted for grinding and cutting a food ingredient, and includes a grip mechanism, a cylindrical cutter set, and a driving mechanism.

The grip mechanism includes a handle body that is formed with an inlet for receiving the food ingredient therein, and a flip cover body that is pivotally connected to the handle body in a manner that the flip cover body is pivotable relative to the handle body between a closing position and an open position. The flip cover body moving toward the closing position is capable of pushing the food ingredient into the inlet opening.

The cylindrical cutter set is detachably mounted in the handle body, and includes a cylindrical cutter that is rotatable to cut and grind the food ingredient in the inlet opening.

The driving mechanism is mounted in the grip mechanism, and includes a driving unit that is configured to drive rotation of the cylindrical cutter, a power supply unit, and first and second switch units that are electrically connected in series between the driving unit and the power supply unit and that are exposed outwardly of the handle body of the grip mechanism. The second switch unit is actuated to turn on by the flip cover body as the flip cover body pivots from the open position toward the closing position. The driving unit operates with electric power supplied from the power supply unit when the first and second switch units are turned on.

BRIEF DESCRIPTION OF THE DRAWINGS

Other features and advantages of the disclosure will become apparent in the following detailed description of an embodiment with reference to the accompanying drawings. It is noted that various features may not be drawn to scale.

FIG. 1 is a perspective view of the embodiment of a food grinder according to the disclosure.

FIG. 2 is a partially exploded perspective view of the embodiment.

FIG. 3 is an exploded perspective view of the embodiment.

FIG. 4 is a schematic sectional view illustrating the embodiment when a flip cover body is in a closing position.

FIG. 5 is a schematic sectional view illustrating the embodiment when the flip cover body is in an open position.

FIG. 6 is an electrical block diagram of the embodiment.

FIG. 7 is a fragmentary schematic sectional view illustrating a cylindrical cutter of the embodiment.

FIG. 8 is a schematic sectional view schematically illustrating the embodiment in use.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 and 8, the embodiment of a food grinder 200 of the disclosure is adapted for cutting and grinding of a food ingredient, such as nuts, chocolate, cheese, etc. In the embodiment, the food is exemplarily a block of cheese 900, and the food grinder 200 is exemplarily used to produce cheese shreds or cheese crumbs 901 from the block of cheese 900, as shown in FIG. 8. The food grinder 200 includes a grip mechanism 3 for a user to hold, a cylindrical cutter set 4 detachably mounted in the grip mechanism 3, and a driving mechanism 5 mounted to the grip mechanism 3. For convenience of illustration, the left and right sides of FIG. 1 are regarded as the front and rear of the food grinder 200, respectively.

Referring to FIGS. 1 to 5, the grip mechanism 3 includes a handle body 31, an elongate flip cover body 32 located above the handle body 31, and a lateral cover body 33 mounted removably to a lateral side (e.g., left side) of the handle body 31.

The handle body 31 has a mounting seat portion 311, and an elongate handle portion 315 extending rearwardly from the mounting seat portion 311. The mounting seat portion 311 is formed with an interior mounting space 312 for receiving the cylindrical cutter set 4 therein, an inlet 313 in the top thereof (i.e., an upper opening), and a mounting opening 314 in the lateral (e.g., left) side thereof. The interior mounting space 312, the inlet 313 and the mounting opening 314 are communicated with each other. The inlet 313 allows the block of cheese 900 to be fed into the interior mounting space 312. A pivot shaft 30, which is provided on a rear end of the handle portion 315 (see FIG. 4), serves as a pivot for the flip cover body 32 to pivot relative to the handle body 31.

The lateral cover body 33 has an opening 331 communicated with the mounting opening 314 in the mounting seat portion 311.

Figure 1:
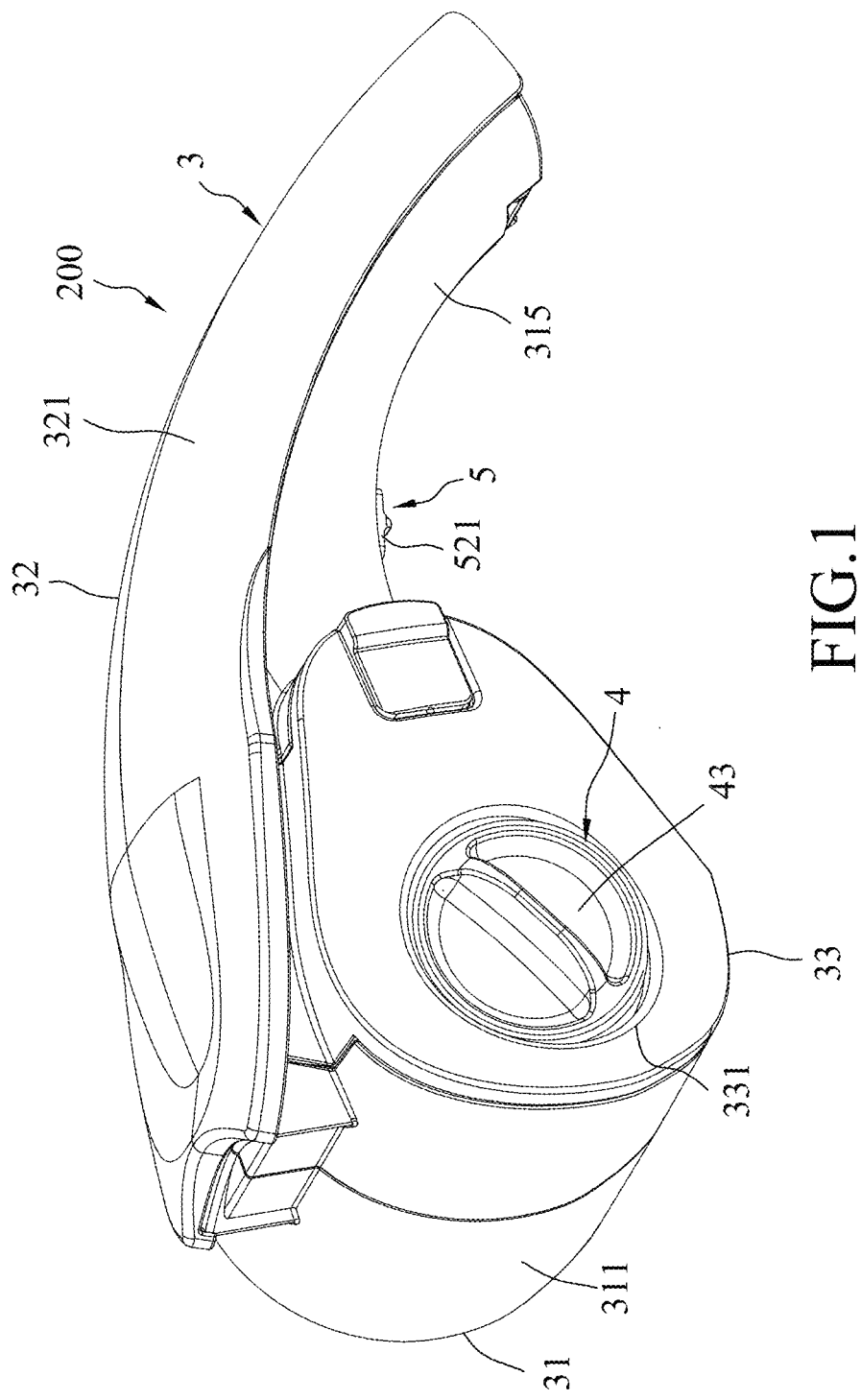
Figure 2:
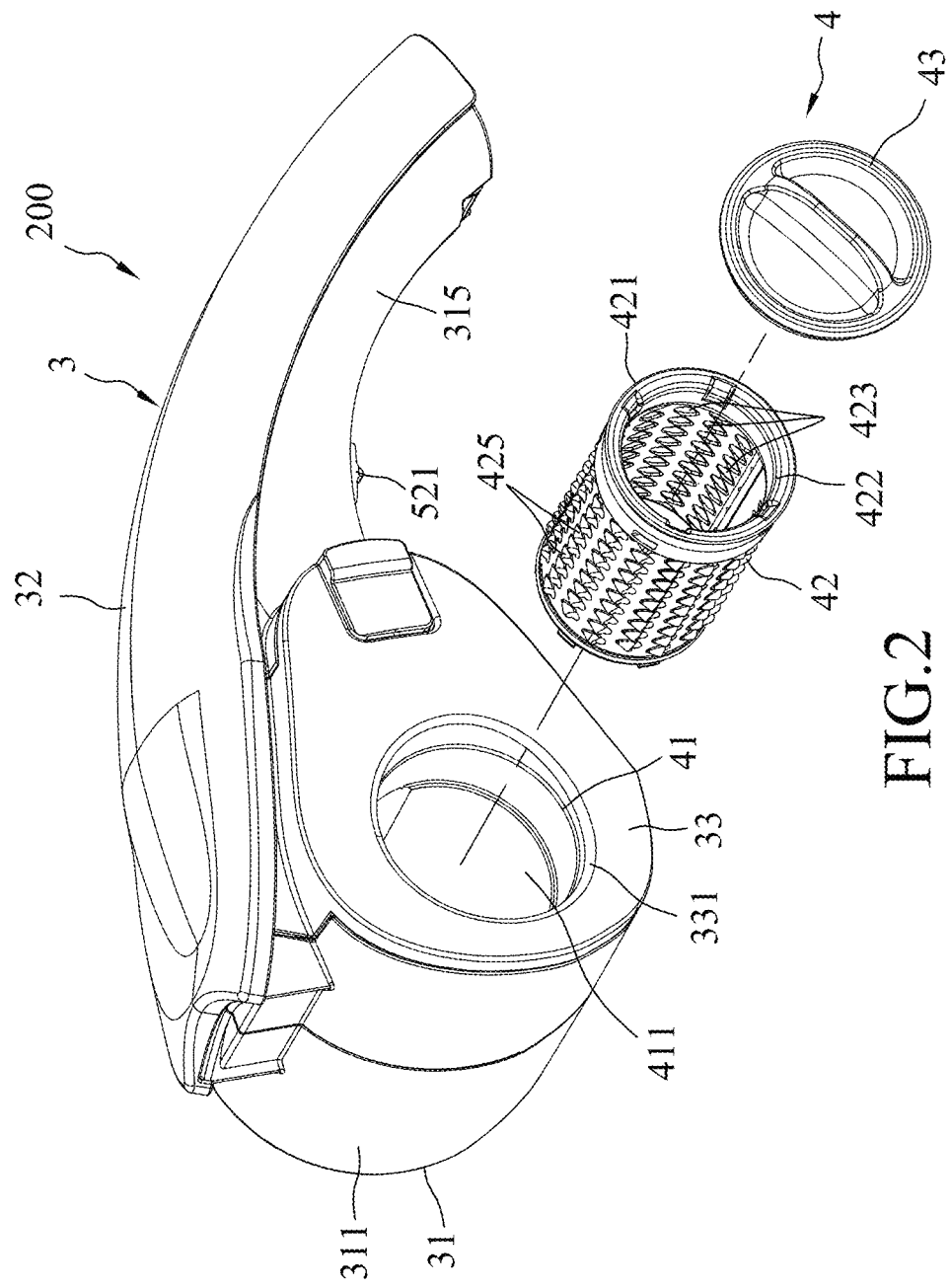
Figure 3:
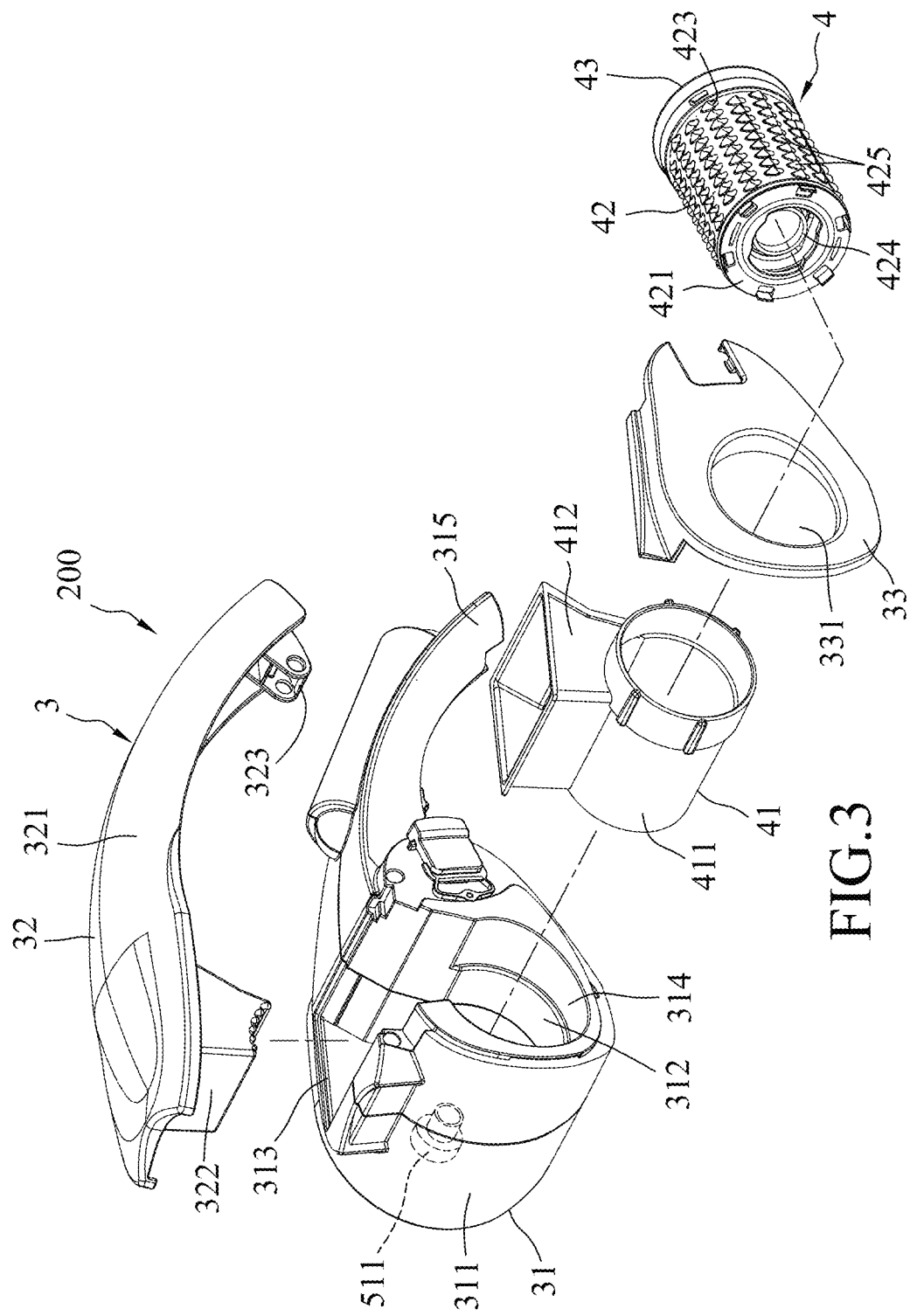
Figure 4:
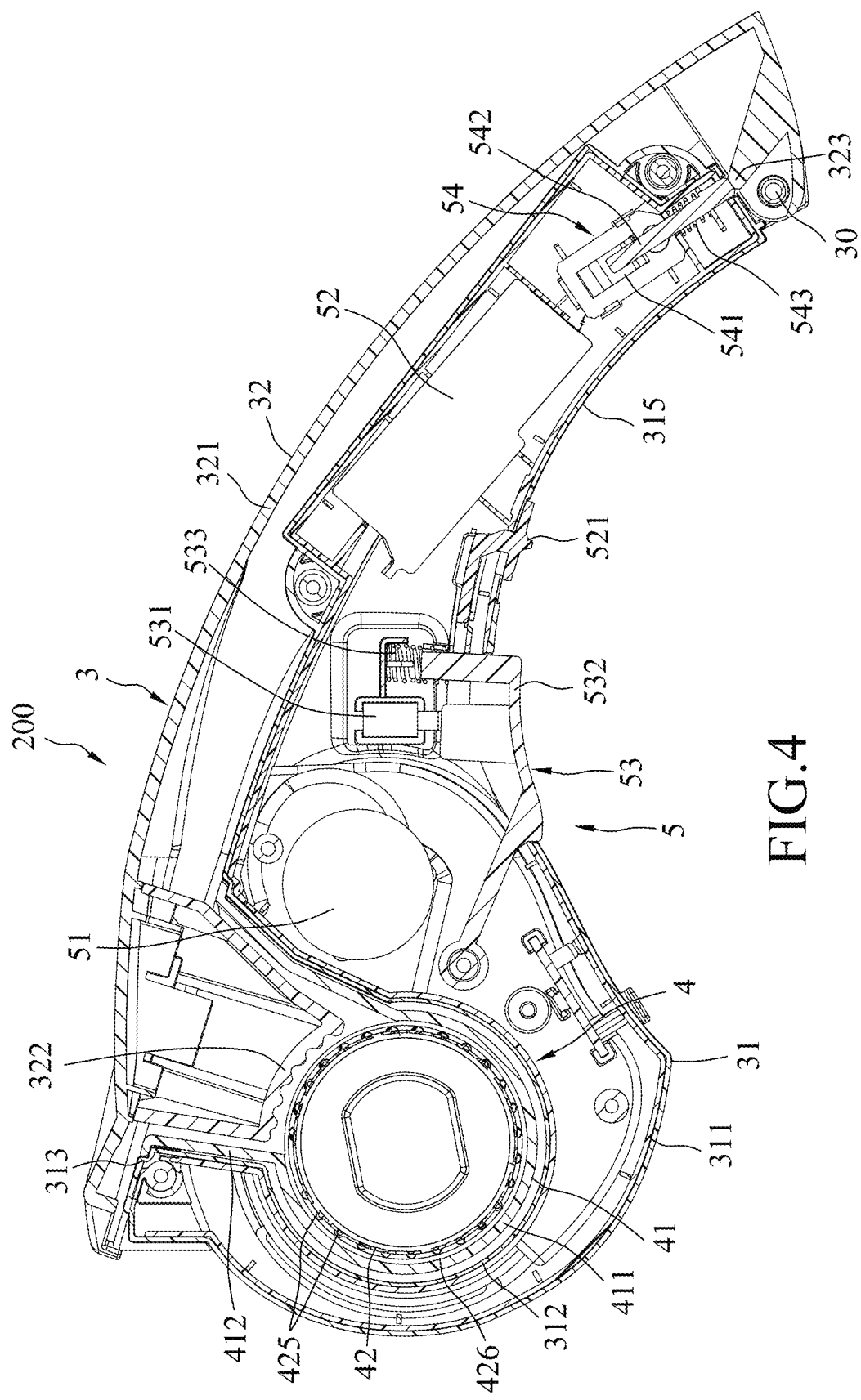
Figure 5:
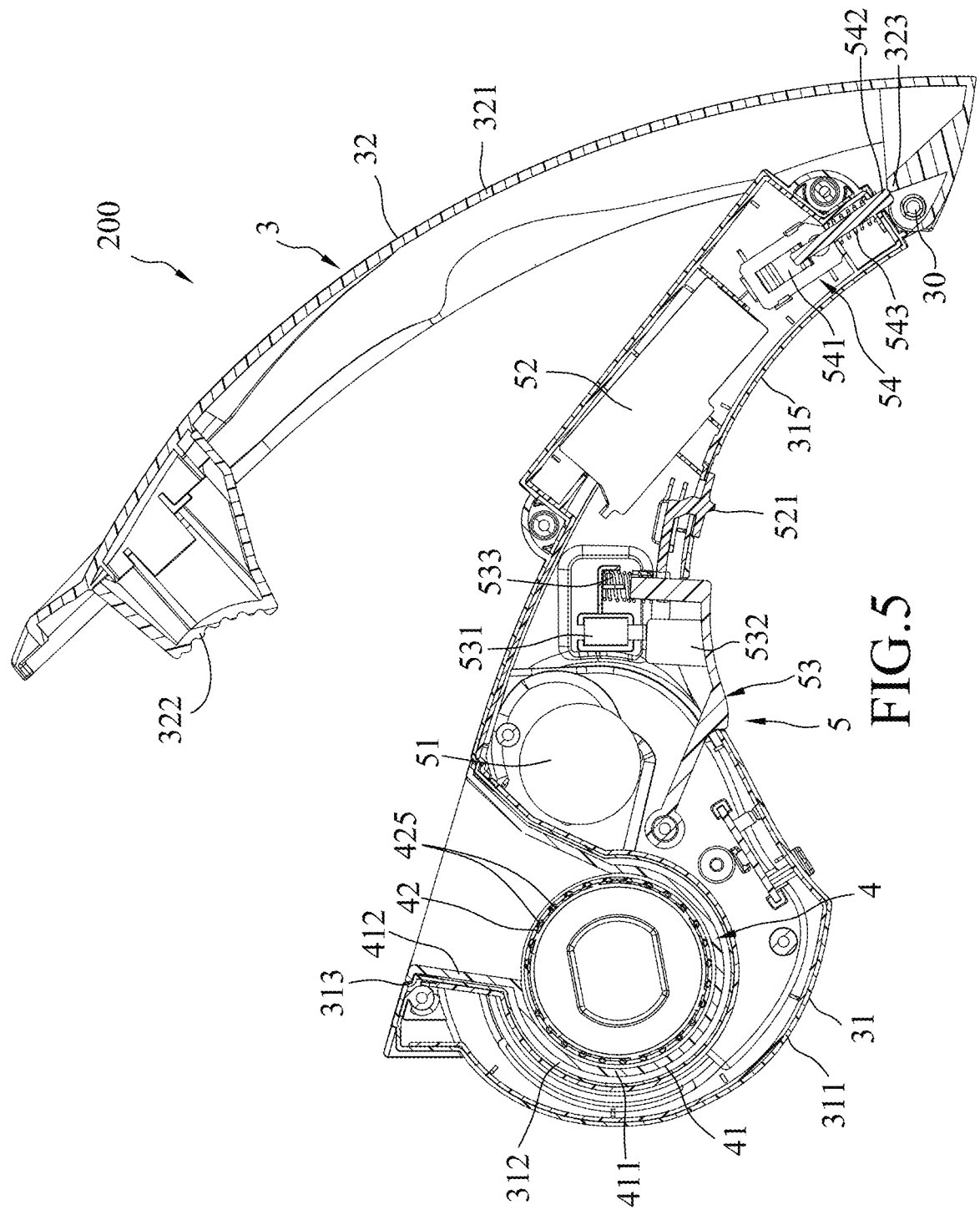
Figure 6:
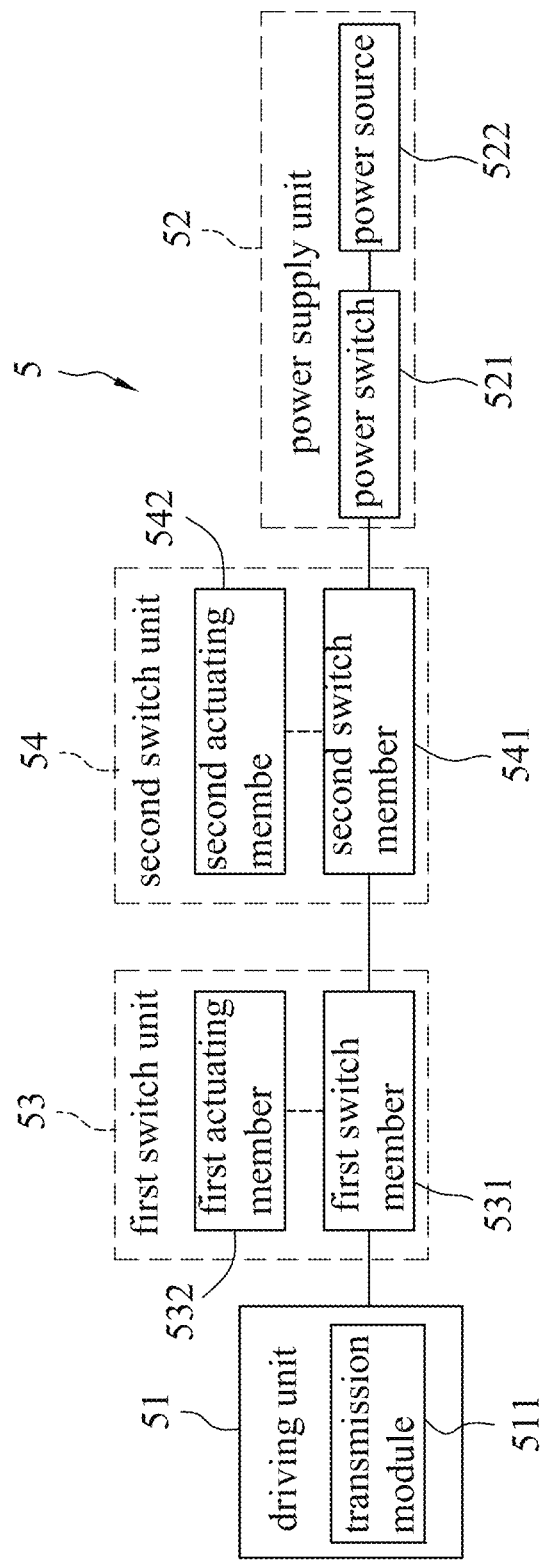
Figure 7:
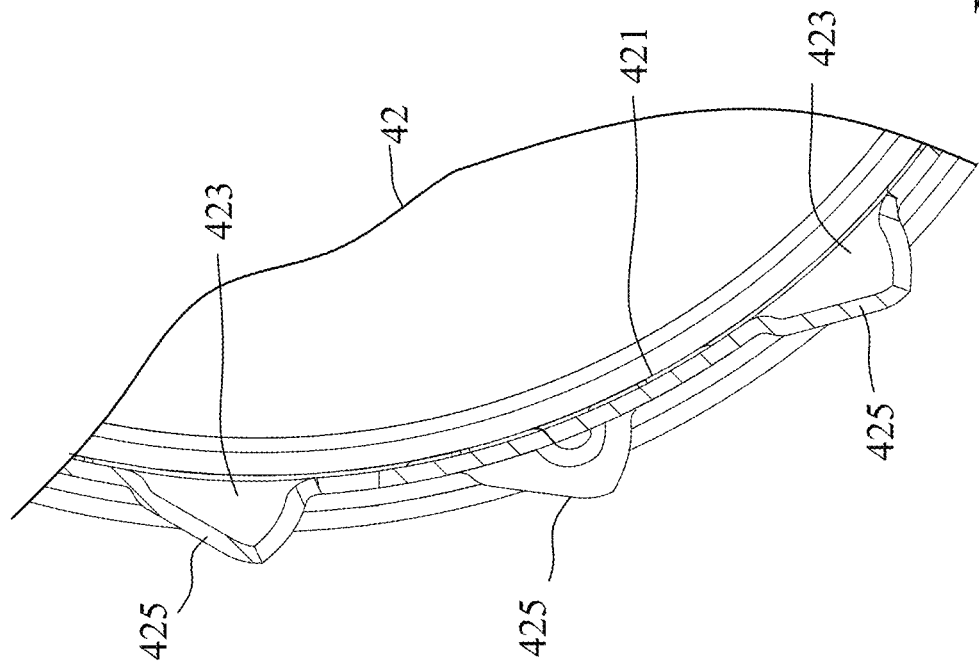

The flip cover body 32 is pivotally connected to the handle portion 315 of the handle body 31 in a manner that the flip cover body 32 is pivotable relative to the handle portion 315 of the handle body 31 between a closing position (see FIG. 4) and an open position (see FIG. 5). In this embodiment, the flip cover body 32 has an elongate operating handle portion 321 having a rear end (distal from the mounting seat portion 311 of the handle body 31) that is pivoted on the pivot shaft 30 (see FIG. 4), a pressing protrusion 322 downwardly extending from a front end of the operating handle portion 321 toward the mounting seat portion 311, and a pushing portion 323 extending from the rear end of the operating handle portion 321 toward the rear end of the handle portion 315 of the handle body 31. As the flip cover body 32 is pivoted from the open position toward the closing position, the flip cover body 32 is capable of pushing the block of cheese 900 into the inlet 313, and more specifically, the operating handle portion 321 moves toward the handle body 31 such that the pressing protrusion 322 presses the block of cheese 900 to abut against the cylindrical cutter set 4 (see FIG. 8), at which time the flip cover body 32 is said to be in a "pressing state." When the pressing protrusion 322 is fully inserted into the inlet 313 and the operating handle portion 321 abuts against the handle body 31, the flip cover body 32 is in the closing position (see FIG. 4). Conversely, when the flip cover body 32 is pivoted (from the closing position) to the open position, the operating handle portion 321, along with the pressing protrusion 322, moves away from the handle body 31. Furthermore, when the flip cover plate 32 is pivoted, the operating handle portion 321 rotates along with the pushing portion 323. The function of the pushing portion 323 will be explained below.

Referring to FIGS. 2, 3, 4, and 7, the cylindrical cutter set 4 is disposed in the mounting seat portion 311 of the handle body 31, and includes a cutter mounting seat 41, a cylindrical cutter 42 and a cutter cap 43.

The cutter mounting seat 41 is detachably mounted in the interior mounting space 312 in the mounting seat portion 311. Specifically, the cutter mounting seat 41 is mounted into the interior mounting space 312 through the mounting opening 314 in the mounting seat portion 311, and can be removed from the interior mounting space 312 through the mounting opening 314. In this embodiment, the cutter mounting seat 41 includes a laterally extending mounting tube portion 411, and a feeding tube portion 412 upwardly extending from the mounting tube portion 411 and communicated with the mounting tube portion 411 and the inlet 313. It is noted that the feeding tube portion 412 is downwardly tapered such that the block of cheese 900 in the inlet 313 can be guided by the feeding tube portion 412 into the mounting tube portion 411.

The cylindrical cutter 42 is detachably mounted in the mounting tube portion 411 of the cutter mounting seat 41, and is detachably connected to and driven by a transmission module 511 of a driving unit 51 of the driving mechanism 5 disposed in the mounting space 312 (see FIG. 3) to rotate in the mounting tube portion 411 such that the block of cheese 900 guided into the mounting tube portion 411 can be cut and grinded by the rotating cylindrical cutter 42. In this embodiment, the cylindrical cutter 42 has a hollow cylindrical body 421 that is formed with a plurality of outwardly projecting and spaced-apart blade parts 425 and a plurality of through holes 423 that respectively correspond to the blade parts 425. The blade parts 425 and the through holes 423 can be simultaneously formed by punching. The hollow cylindrical body 421 has a connecting end portion 424 coaxially and detachably mounted on the transmission module 511, and an outlet 422 opposite to the connecting end portion 424 and communicated with the mounting opening 314 of the mounting seat portion 311.

The cutter cap 43 openably closes the outlet 422 of the hollow cylindrical body 421, and can be removed through the opening 331 in the lateral cover body 33 when the lateral cover body 33 is mounted to the handle body 31, the cutter mounting seat 41 is mounted in the interior mounting space 312 in the mounting seat portion 311 and the cylindrical cutter 42 is mounted in the mounting tube portion 411 of the cutter mounting seat 41.

Referring to FIGS. 4 to 6 and 8, the driving mechanism 5 is mounted in the handle body 31, and includes the driving unit 51, which includes the transmission module 511, a power supply unit 52, a first switch unit 53, and a second switch unit 54.

The driving unit 51 is configured to drive rotation of the cylindrical cutter 42 with the transmission module 511, and is in the form of a motor and transmission assembly. Since the driving unit 51 is well-known and comes in a variety of modular types and structures, details thereof are not further described.

The power supply unit 52 is electrically connected to the driving unit 51, and is configured to supply electric power for operation of the driving unit 51, and includes a power source 522, such as a rechargeable or non-rechargeable battery module, that supplies the electric power, and a power switch 521 that is electrically connected to the power source 522 and exposed from the bottom of the handle portion 315. When the power switch 521 is turned on, the power supply unit 52 outputs the electric power supplied from the power source 522. However, in other embodiments, the power source 522 may be an external power source, such as a commercial power source, that can be used with an adapter to supply the electric power for the driving unit 51.

The first and second switch units 53, 54 are electrically connected in series between the power supply unit 52 and the driving unit 51 (see FIG. 6), and are exposed outwardly of the handle body 31 (see FIG. 5). The first switch unit 53 can be manually actuated to turn on, and the second switch unit 54 can be actuated to turn on by the flip cover body 32 when the flip cover body 32 is transitioning from the open position to the closing position. When the first and second switch units 53, 54 are turned on, the driving unit 51 operates with the electric power supplied from the power supply unit 52 (by this time, the power switch 521 should have been turned on).

In this embodiment, the first switch unit 53 includes a first switch member 531, a first actuating member 532, and a first biasing member 533, such as a coil spring. The first switch member 531, such as a micro switch, is disposed in the handle body 31 and is electrically connected between the driving unit 51 and the second switch unit 54 (see FIG. 6). The first actuating member 532 is connected pivotally (or movably) to the handle body 31 and is exposed from the bottom of the handle body 31. The first actuating member 532, serving as a manually operable actuator, is operable to actuate the first switch member 531 to an ON-state by applying a pressing force thereto. The first biasing member 533 is disposed in the handle portion 315 and abuts against the first actuating member 532 for biasing the first actuating member 532 to move away from the first switch member 531. When the first actuating member 532 is pressed to actuate the first switch member 531 to the ON-state, the first biasing member 533 deforms and accumulates a biasing force.

In this embodiment, the second switch unit 54 includes a second switch member 541, a second actuating member 542 and a second biasing member 543. The second switch member 541, such as a micro switch, is disposed in the rear end of the handle portion 315 of the handle body 31, and is electrically connected between the first switch member 531 and the power switch 521 of the power supply unit 52 (see FIG. 6). The second actuating member 542 is disposed movably in the handle portion 315, and extends outwardly of the rear end of the handle portion 315 to contact the pushing portion 323 of the flip cover body 32 (see FIG. 5). The second actuating member 542 is operable to actuate the second switch member 541 to an ON-state by applying a pushing force thereto. The second biasing member 543, such as a coil spring, is restricted in the handle portion 315 and abuts against the second actuating member 542 for biasing the second actuating member 542 to move away from the second switch member 541. However, in other embodiments, the second switch unit 54 may also be designed to include one of a photoelectric switch, a mechanical switch and a magnetic sensing switch that is actuated by the flip cover body 32 as the flip cover body 32 transitions from the open position to the closing position.

Figure 8:
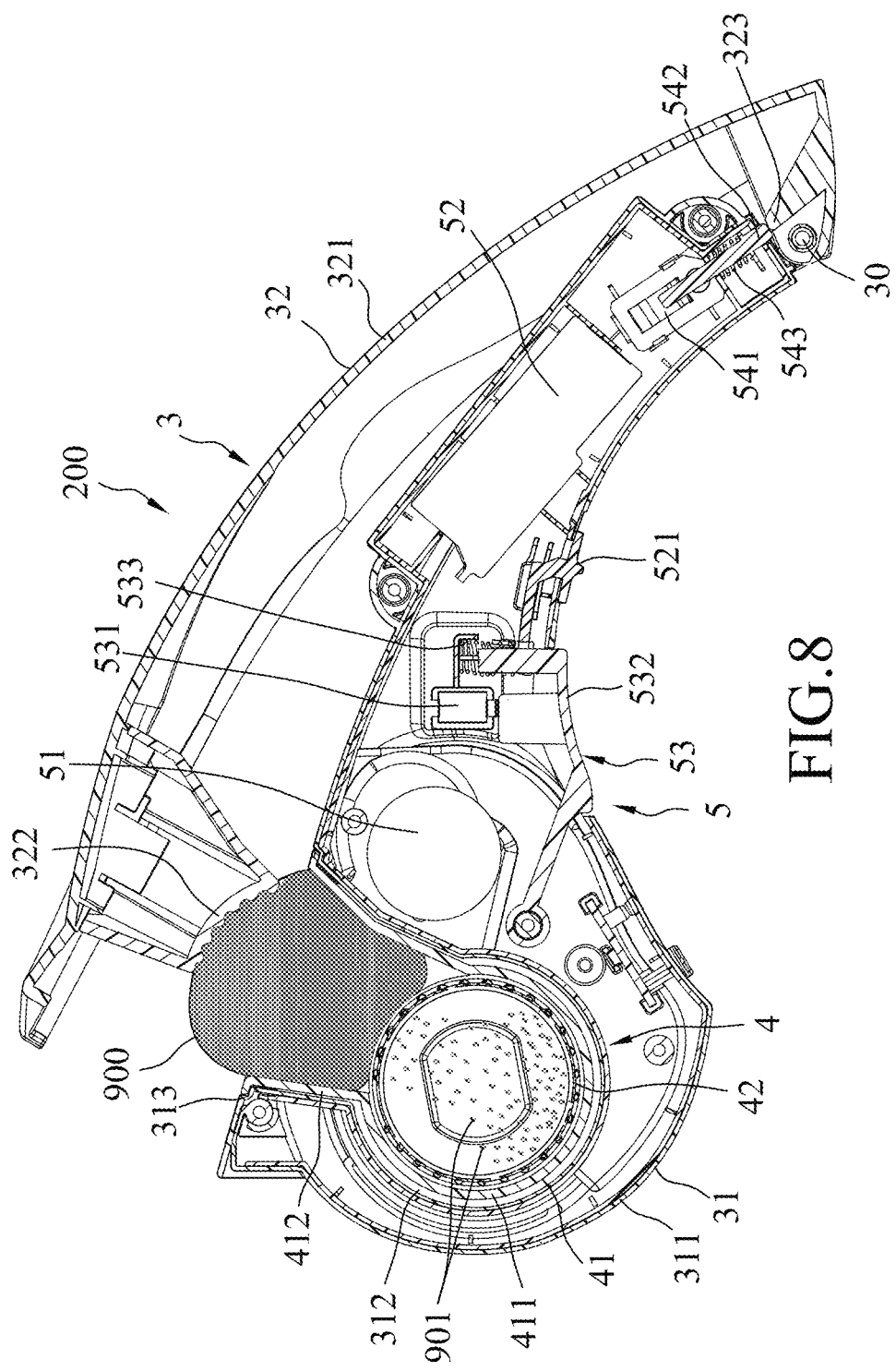

It is noted that, when the flip cover body 32 is being pivoted toward the closing position, the operating handle portion 321 moves toward said handle body 31 such that the pushing portion 323 of the flip cover body 32 moves toward the rear end of the handle portion 315 and pushes the second actuating member 542 to actuate the second switch member 541 to the ON-state (see FIG. 8). When the second actuating member 542 is pushed to actuate the second switch member 541 to the ON-state, the second biasing member 543 deforms to accumulate a biasing force.

In use, after the flip cover body 32 is first pivoted to the open position to expose the inlet 313 (FIG. 5), the block of cheese 900 (see FIG. 8) is put into the inlet 313 (specifically, the feeding tube portion 412 at the inlet 313), and the power switch 521 of the power supply unit 52 is then turned on. At this time, since the second actuating member 542 of the second switch unit 54 extends outwardly of the rear end of the handle portion 315 to the fullest extent, the second switch member 541 of the second switch unit 54 is not actuated and remains in an OFF-state. Therefore, even if the first actuating member 532 of the first switch unit 53 is accidentally pressed to actuate the first switch member 531 of the first switch unit 53 to the ON-state, the driving unit 51 would not operate since the electric power from the power supply unit 52 is not supplied thereto, thereby avoiding accidental rotation of the cylindrical cutter 42, which would have occurred in the aforesaid prior art. Next, the flip cover body 32 is pivoted from the open position toward the closing position to be in the pressing state (see FIG. 8) where the block of cheese 900 is pushed downwardly toward the cutter mounting seat 41 to abut against the cylindrical cutter 42. When the first actuating member 532 of the first switch unit 53 is pressed by a user's hand holding the handle body 31 to actuate the first switch member 531 of the first switch unit 53 to the ON-state while the second actuating member 542 of the second switch unit 54 is pushed by the pushing portion 323 to actuate the second switch member 541 of the second switch unit 54 to the ON-state, the electric power supplied from the power source 522 is transmitted to the driving unit 51 via the power switch 521 and the second and first switch members 541, 531 that are in the ON-state, such that the driving unit 51 operates with the electric power to drive the cylindrical cutter 42 to cut and grind the block of cheese 900.

During operation of the driving unit 51, cheese shreds/crumbs 901 cut/grinded from the block of cheese 900 by the blade parts 425 of the cylindrical cutter 42 would fall into the hollow cylindrical body 421 through the through holes 423. It is noted that, during operation of the driving unit 51, once the user's hand releases the first actuating member 532 of the first switch unit 53, the first biasing member 533 would bias the first actuating member 532 to move away from the first switch member 531, and the first switch member 531 would thus be turned off, i.e., be in an OFF-state, so that operation of the driving unit 51 would stop due to lack of electric power from the power supply unit 52 to thereby terminate driving of the cylindrical cutter 42. As the operating handle portion 321 of the flip cover body 32 continues to be moved downwardly, it will eventually come into abutment against the mounting seat portion 311 of the handle body 31, and at this time, the flip cover body 32 is in the closing position, where the block of cheese 900 would have been fully processed (cut/grinded into cheese shreds or crumbs 901). At this time, the user's hand may release the first actuating member 532 of the first switch unit 53 so as to turn the first switch member 531 to the OFF-state, such that operation of the driving unit 51 would stop. Then, after the cutter cap 43 is opened, the cheese shreds/crumbs 901 received in the hollow cylindrical body 421 can be poured out through the outlet 422.

When processing of the block of cheese 900 is finished, the lateral cover body 33, the cutter mounting seat 41 and the cylindrical cutter 42 can be easily detached from the handle body 31 for cleaning.

In this embodiment, the second switch unit 54 and the first switch unit 53 are designed to be micro switch modules, but in other embodiments of the present disclosure, the second switch unit 54 may alternatively have a photo-electric switch module design, a mechanical tact switch module design, or a magnetic sensor switch module design, in which case the second switch unit 54 would be actuated by the flip cover body 32 to switch to the ON state when the angle between the flip cover body 32 and the handle body 31 is less than a predetermined angle.

In summary, in view of the presence of the first and second switch units 53, 54 that are electrically connected in series between the driving unit 51 and the power supply unit 52, the driving unit 51 operates with the electric power from the power supply unit 52 only when the first and second switch units 53, 54 are turned on. In other words, when any one of the first and second switch units 53, 54 is turned off, operation of the driving unit 51 stops. Therefore, safety during use of the food grinder 200 is enhanced. Furthermore, the structure of the cylindrical cutter set 4 is designed to be easily detachable from the handle body 31, making cleaning the cutter mounting seat 41, the cylindrical cutter 42 and the cutter cap 43 convenient. Therefore, the object of this disclosure can indeed be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A food grinder adapted for grinding and cutting a food ingredient, comprising:
   a grip mechanism including a handle body formed with an inlet for receiving the food ingredient therein, and a flip cover body pivotally connected to the handle body, the flip cover body being pivotable relative to the handle body between a closing position and an open position, the flip cover body moving toward the closing position and being capable of pushing the food ingredient into the inlet;
   a cylindrical cutter set detachably mounted in the handle body and including a cylindrical cutter rotatable to cut and grind the food ingredient in the inlet; and
   a driving mechanism mounted in the grip mechanism, the driving mechanism including a driving unit configured to drive rotation of the cylindrical cutter, a power supply unit, and a first switch unit and a second switch unit, wherein the first switch unit and the second switch unit are electrically connected in series between the driving unit and the power supply unit and are exposed outwardly of the handle body of the grip mechanism, the second switch unit being actuated to turn on by the flip cover body as the flip cover body pivots from the open position to the closing position, the driving unit operating with electric power supplied from the power supply unit when the first switch unit and the second switch unit are turned on.

2. The food grinder of claim 1, wherein the first switch unit includes a first switch member disposed in the handle body, and a first actuating member connected movably to and exposed from the handle body and operable to actuate the first switch member.

3. The food grinder of claim 2, wherein:
   the first switch unit further includes a first biasing member limited in the handle body to abut against the first actuating member for biasing the first actuating member to move away from the first switch member; and
   when the first actuating member is pressed to actuate the first switch member to an ON-state, the first biasing member deforms to accumulate a biasing force.

4. The food grinder of claim 1, wherein:
   the second switch unit includes a second switch member disposed in the handle body, a second actuating member disposed movably in and extending outwardly of the handle body and operable to actuate the second switch member, and a second biasing member restricted in the handle body to abut against the second actuating member for biasing the second actuating member to move away from the second switch member; and
   the second actuating member is pushed by the flip cover body to actuate the second switch member to an ON-state as the flip cover body pivots from the open position to the closing position.

5. The food grinder of claim 1, wherein the second switch unit includes one of a micro switch, a photoelectric switch, a mechanical switch and a magnetic sensing switch, the second switch unit being actuated by the flip cover body as the flip cover body pivots from the open position to the closing position.

6. The food grinder of claim 1, wherein:
   the power supply unit includes a power switch exposed from the handle body; and
   the driving unit operates with the electric power supplied from the power supply unit when the power switch, the first switch unit, and the second switch unit are turned on.

7. The food grinder of claim 1, wherein:
   the handle body includes a mounting seat portion formed with the inlet and mounted with the cylindrical cutter set therein, and a handle portion connected to the mounting seat portion and mounted with the first switch unit and the second switch unit therein;
   the flip cover body has an operating handle portion with one end distal from the mounting seat portion and connected pivotally to the handle portion, a pressing protrusion extending from the operating handle portion toward the mounting seat portion, and a pushing portion extending from the operating handle portion toward the second switch unit; and
   as the flip cover body pivots from the open position to the closing position, the operating handle portion moves toward the handle body such that the pressing protrusion presses the food ingredient in the inlet to abut against the cylindrical cutter set and that the pushing portion moves to actuate the second switch unit to an ON-state.

8. The food grinder of claim 7, wherein:
   the inlet of the mounting seat portion is in the form of an upper opening;
   the cylindrical cutter set further includes a cutter mounting seat mounted in the mounting seat portion, the mounting seat portion including a mounting tube portion mounted with the cylindrical cutter therein, and a feeding tube portion extending from the mounting tube portion and communicated with the mounting tube portion and the inlet;
   the food ingredient in the inlet is guided by the feeding tube portion into the mounting tube portion; and
   the cylindrical cutter is detachably connected to and driven by the driving unit to rotate in the mounting tube portion such that the food ingredient guided into the mounting tube portion is cut and grinded by the rotating cylindrical cutter.

9. The food grinder of claim 8, wherein:
   the mounting seat portion further has a mounting opening that allows said cutter mounting seat to be detachably mounted in the mounting seat portion therethrough; and the driving unit includes a transmission module coaxially and detachably connected to the cylindrical cutter in the cutter tube portion of the cutter mounting seat.

10. The food grinder of claim 9, wherein the cylindrical cutter has a hollow cylindrical body formed with a plurality of outwardly projecting and spaced-apart blade parts and a plurality of through holes, the hollow cylindrical body having an outlet communicated with the mounting opening of the mounting seat portion.

11. The food grinder of claim 10, wherein the cylindrical cutter set further includes a cutter cap openably closing the outlet of the hollow cylindrical body.

\* \* \* \* \*